United States Patent [19]

Meynier

[11] Patent Number: 4,928,784

[45] Date of Patent: May 29, 1990

[54] ANTI-BOUNCE DEVICE FOR PREVENTING THE MULTIPLE SHOCKS OF A MOVING MASS AFTER A FIRST IMPACT AGAINST ANOTHER ELEMENT

[75] Inventor: Patrick Meynier, Chatou, France

[73] Assignee: Institut Fancais du Petrole, Rueil-Malmaison, France

[21] Appl. No.: 350,166

[22] Filed: May 11, 1989

[30] Foreign Application Priority Data

May 11, 1988 [FR] France .................. 88 06425

[51] Int. Cl.$^5$ .............................. G01V 1/40
[52] U.S. Cl. .................... 181/106; 181/121; 367/911
[58] Field of Search .................. 181/102–106, 181/400, 401; 367/25, 911, 912

[56] References Cited

U.S. PATENT DOCUMENTS 4,037,344  7/1977  Reed ................... 89/35 R X
4,770,268  9/1988  Magneville .............. 181/106
4,773,501  9/1988  Dedole et al. ............ 181/106

Primary Examiner—Brian S. Steinberger
Attorney, Agent, or Firm—Antonelli, Terry, Stout & Kraus

[57] ABSTRACT

An anti-bounce device for avoiding the multiple shocks of a moving mass after a first impact against another element. Magnetic arrangements are associated with element for exerting an attractive force on the mass sufficient to prevent possible bouncing. These arrangements comprise, for example electromagnets and circuits for connecting the electromagnets to a current source via a switch. Permanent magnets may also be associated therewith. The direction of the electric current is then chosen so that the electromagnetic forces developed are added to the attractive forces of the permanent magnets or else for cancelling these latter out, which allows the mass to be released.

12 Claims, 1 Drawing Sheet

U.S. Patent
May 29, 1990
4,928,784
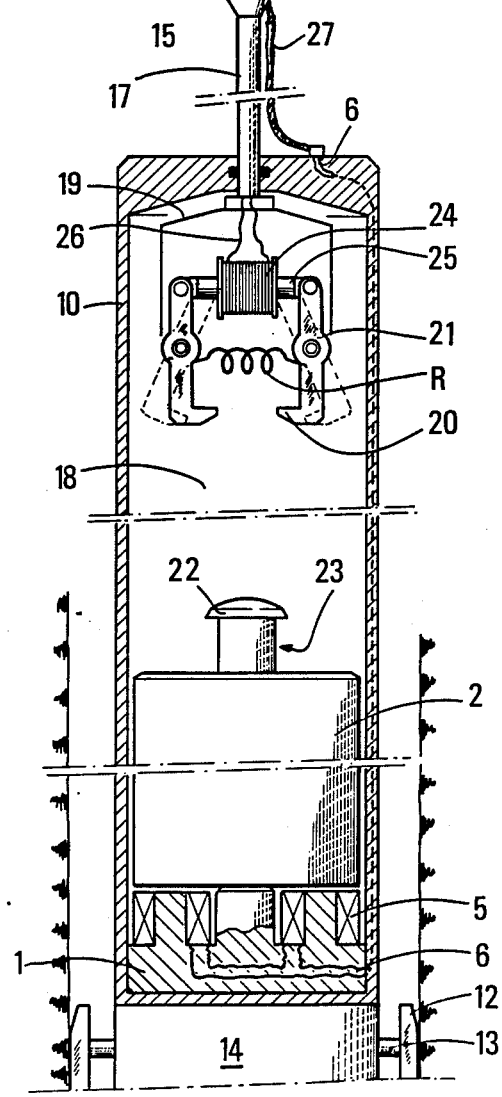
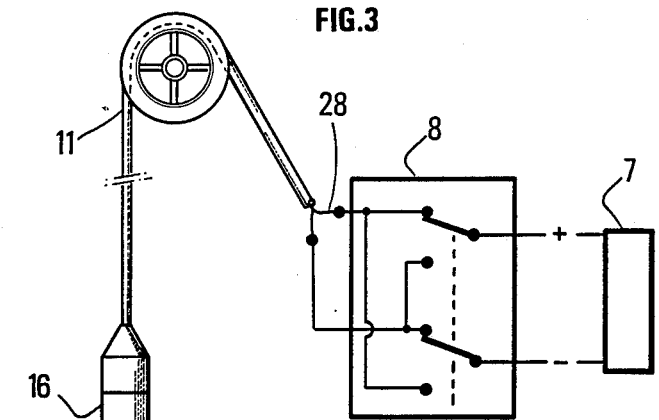
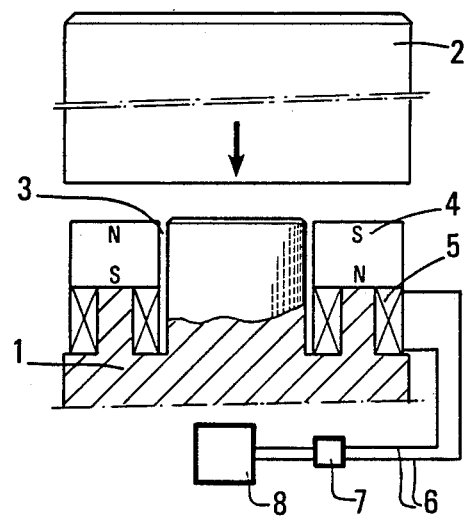
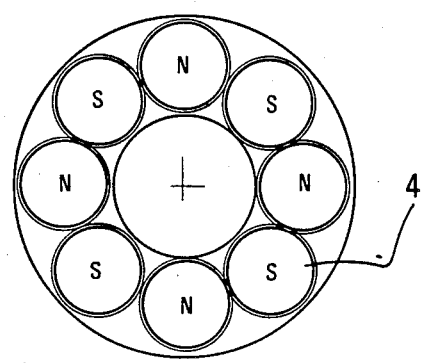

ANTI-BOUNCE DEVICE FOR PREVENTING THE MULTIPLE SHOCKS OF A MOVING MASS AFTER A FIRST IMPACT AGAINST ANOTHER ELEMENT

BACKGROUND OF THE INVENTION

The present invention relates to an anti-bounce device for preventing the multiple shocks of a moving mass after a first shock or impact against another element.

The device of the invention may be used for very different applications. It finds its application more particularly in the field of seismic or acoustic wave sources where a moving mass forcibly strikes a target element against which it is precipitated by gravity and/or drive means. A percussion source for land seismic prospection comprising a mass falling along a guide means towards a target element anchored against the surface of the ground is described in French Pat. No. 2 398 316 and corresponding U.S. Pat. No. 4,205,731. Another, adapted more particularly to use in a borehole, is described in French Pat. No. 2 552 553. The use of drive means for hurling a mass against a target element anchored in a well described in French Pat. No. 2 558 and corresponding U.S. Pat. No. 4,648,478.

When the mass is left free, it generally bounces after impact against the associated target element and then strikes it one of more times with decreasing force. The "signature" of the seismic source, i.e. the shape of the pulses which it emits, comprises then in this case several secondary pulses of decreasing amplitude following the main pulse and this disturbs the seismic recordings corresponding to the seismic reflections from the discontinuities of the sub-soil of the shocks transmitted.

In French Pat. Nos. 1 337 935 and 548313 sound generators are described comprising members vibrating under the effect of the shocks of striking elements hurled towards them, and means for exerting recoil forces which prevent said striking elements from again coming into contact after the first impact.

From the French Pat. No. 2,509,052, and corresponding U.S. Pat. No. 4,505,362 a device is known or preventing multiple shocks on a target element, coupled with the surface of the ground, of a mass guided in its fall by guide means, with these multiple shocks being due to bouncing of the mass after its first impact. This device comprises essentially a deformable element fastened to the guide means and control means adapted for applying the deformable element against the lateral wall of the mass after its first bounce and immobilizing it before it falls again. The control means comprise, for example, a movable member moved radially by the action of a hydraulic cylinder and an impact detector delivering a cylinder control signal.

This device very efficiently stops any falling back of the mass but, because of its transverse position perpendicular to the longitudinal axis of the guide means, its size would not be compatible with the reduced dimensions of boreholes in which the well seismic sources are generally lowered.

SUMMARY OF THE INVENTION

The device of the invention avoids the multiple shocks of a moving mass after its first impact against an object or an element, in all cases where the lateral space about the fall direction is restricted. Contrary to the prior art devices previously mentioned which prevent the moving mass from coming back into contract with the impacted element by blocking it after its first bounce, the device of the invention seeks to prevent bouncing.

It is characterized in that it comprises magnetic means for exerting an intermittent attractive force on the mass which results in applying it against the object and preventing it recoil under the effect of the impact.

The device of the invention avoids in particular the bouncing of a moving mass after a first impact against a target element in contact with geological formations so as to form a seismic source with a "signature" free of secondary pulses.

The magnetic means comprise, for example, at least one permanent magnet, at least one electromagnet, electric current supply means and control means for creating a magnetic force of the same direction as the magnetic force of the permanent magnet or in a direction opposite this force so as to substantially cancel out the attractive force and facilitate separation of the mass.

BRIEF DESCRIPTION OF THE DRAWINGS

Other characteristics and advantages of the device of the invention will be clear from the following description of embodiments given by way of non limitative examples, with reference to the accompanying drawings in which:

FIG. 1 is a sectional view of a device associated with any target element;

FIG. 2 is a top view of the same device comprising permanent magnets disposed in a ring; and FIG. 3 is an example of applying the device where the magnetic force is used for avoiding bouncing of a mass after impacting a target element anchored in a well.

DESCRIPTION OF THE PREFERRED EMBODIMENTS

The device of the invention is associated with a target element 1 adapted for receiving the impacts of a moving mass 2. It comprises magnetic means associated with the target element 1 for exerting an intermittent attractive force on the mass 2. The target element 1 comprises a recess 3 housing at least one magnetic assembly formed of a permanent magnet 4 and an electromagnet 5 connected by a supply cable 6 to a DC source 7, via a two position switch 8 allowing the direction of the magnetizing current to be modified at will. The characteristics of the permanent magnet 4 and of the electromagnet 5 of each magnetic assembly and their relative arrangement are chosen so that, in a first position of the switch, 8 the magnetic forces which they exert are of the same direction and attract the mass 2 and in the second position of the same switch 8 they are opposite one another and substantially cancel each other out.

The number and arrangement of the magnetic assemblies are chosen as a function of the form of the target element 1 and of the mass 2. In the case where the target element 1 and the mass 2 have a cylindrical shape, several magnetic assemblies may be disposed symmetrically with respect to the moving direction of the mass 2. Preferably, an even number of permanent magnets (2) is associated with the mass, disposed so that the magnetizing axes of two adjacent magnets are reversed with respect to each other. From the point of view of the mass 2, there will be alternation of north N and south S poles. This arrangement promotes closure of the magnetic force lines between the permanent magnets 4.

An electromagnet 5 is disposed against each permanent magnet 4 so that the direction of the magnetic field created by the flow of the electric current and that of the permanent field are parallel. The coils of the different electromagnets are connected in series for example and so that the flow of the electric current creates, in two adjacent electromagnets 5, magnetic fields opposite in direction to each other.

Depending on the position of the switch 8, an electric current flow is created such that the magnetic forces of a permanent magnet 4 and of the electromagnet 5 of each magnetic assembly are added together, or are subtracted from each other.

The device operates in the following way. When the mass 2 moves towards the target element 1, an electric current is imposed in a direction such that the magnetic forces of the permanent magnets 4 and of electromagnets 5 are added together. The resultant attractive force attracts the mass 2, applies it against the target element 1 and thus prevents any possible bouncing.

After the impact, when the mass 2 is to be brought back to its initial starting position, the direction of the electric current is reversed so that the magnetic forces of the permanent magnets 4 and of the electromagnets 5 cancel each other out and so that the resultant attractive force is cancelled out. The mass 2 may then be separated from the target element 1.

In the example of application shown in FIG. 3, the anti-bounce device is used for preventing the bouncing of a mass 2 against a target element 1 coupled with the wall of a well 9. Mass 2 moves in a straight line inside an elongate body 10 lowered into well 9 at the end of an electric supply and support cable 11 comprising electric supply lines. Towards its end opposite cable 11, body 10 is associated with anchorage shoes 12. These shoes are fixed to the ends of the rods 13 of hydraulic cylinders (not shown) disposed radially in a compartment 14 containing a hydraulic control system. Such a hydraulic system is described in the above French Pat. No. 2 558 610 and corresponding U.S. Pat. No. 4,648,478. The mass 2 is moved from an impact position in contact with the target element 1 to a set position by lifting means. These means comprise a rigid rod 15 connected to cable 11 by a mechanical and electric connector 16. Rod 15 passes through the upper end wall 17 of the body through an opening and inside, in the cavity 18 where the mass 2 moves, it is fixed to retractable fastening means. The means comprise a rigid support 19. Two hooks 20 are pivotable about pins 21 fixed to support 19 between a closed position and a spaced apart position (shown with broken lines in FIG. 3). On its upper face, the mass 2 has a head 22 with a circular groove 23 where the tips of the hooks 20 may be engaged in the closed position and thus make mass 2 fast with the fastening support 19. The hooks 20 are pivoted towards their spaced apart position by energizing electromagnets 24 with movable cores 25. The cores 25 are disposed radially in the pivoting plane of hooks 20 and are connected thereto. A return spring R tends to maintain the hooks 20 in their closed position.

The electromagnets 24 are energized through conductors 26 passing in the axis of the rigid rod 15 and are connected in connector 16 to conducting lines 28 of the electric supply and support cable 11. The electric conductors 6 for supplying the electromagnets 5 of the anti-bounce device are led up through a channel formed in the side wall of body 10 towards the end wall 17 where they are connected to a first end of an electric cable 27 would in a spiral about the rigid rod 15. At its opposite end, the electric cable 27 penetrates into connector 16 where it is connected to electric lines 28 of the electric supply and support cable 11. The electric conductors 6 and 26 are connected so that the electromagnets 5 of the anti-bounce device are connected in series with the coil of the electromagnet 24. Other electric conductors (not shown) transmit electric currents and control signals to the hydraulic system.

At the opposite end of the electric supply and support cable 11, conductors 28 are connected to the electric current source 7 (cf. FIG. 1) via the switch 8. Conductors 6 and 26 are interconnected so that in a first position of switch 8, the electromagnets 24 move hooks 20 away from each other and at the same time the electromagnets 5 exert an attractive force on the mass 2. In the second position of switch 8, these same electromagnets 5 push the hooks 20 back towards their closed up position and exert a repelling force on the mass 2.

With the well source anchored in the well by moving the anchorage shoes 12 apart, the switch 8 is placed in its second position and the cable 11 is released so that the rigid support 19 moves down along cavity 18 towards the mass 2 which is in its position against the target element 1 (low position). Coming into contact with head 22, hooks 20 move apart and are engaged in the groove 23 thereof.

By a tractive force exerted on the electric supply and support cable 11, support 19 and mass 2 which is fastened thereto are raised to a high position.

At the moment chosen for tripping, the switch 8 is placed in its first position. The electromagnets 24 move the hooks 20, which retain the released mass 2, away from each other, the mass 2 falls along the cavity 18 and, coming into contact with the target element, it is subjected to the electromagnetic attractive force developed by the electromagnets 5. The electromagnets are chosen as a function of the kinetic energy acquired by the mass 2 at the end of its fall for preventing any possible bouncing.

Without departing from the scope of the invention, permanent magnets may be added to the well source of FIG. 3, such as magnets 5 shown in FIG. 1 for increasing the magnetic attractive force undergone by mass 2. In the most general case, the association of permanent magnets 4 with electromagnetic means 5 is in no wise obligatory. The magnetic attractive force may possibly be created by electromagnetic means alone.

Without departing from the scope and spirit of the invention, the device of the invention may be applied to any seismic percussion source whatever.

I claim:

1. An anti-bounce device for preventing multiple bouncing of a moving mass upon a first impact of the moving mass against another element, the device comprising magnetic means for exerting a magnetic force on the moving mass in an axial direction of the moving mass, and means for selectively actuating the magnetic means so as to apply the attractive force against the moving mass and prevent a bouncing of the moving mass upon the first impact of the moving mass against the element.

2. An anti-bounce device for preventing multiple bouncing of a moving mass upon a first impact of the moving mass against a fixed target element in contact with geological formations, the device comprising magnetic means for exerting a magnetic attractive force on the moving mass in an axial direction of the moving mass, and means for selectively actuating the magnetic means so as to apply the attractive force against the moving mass to hold the moving mass against the target element and prevent the moving mass from bouncing off the target element upon the first impact of the moving mass against the target element.

3. The anti-bounce device as claimed in claim 2, wherein said target element is fixedly secured to an elongated body associated with retractable anchorage means for coupling the elongated body with walls of the geological formations, said magnetic means comprise at least one electromagnet means, and wherein said means for selectively actuating includes supply circuit means connected to conducting line means of an electric supply means, support cable means for connecting said elongated body to a surface installation, and controls switch means for connecting said conducting line means to an electric current source of the electric supply means.

4. The anti-bounce device as claimed in claim 3, wherein the supply circuit means comprises conductor means disposed inside said elongated body, a cable means disposed externally of said elongated body, and an electric connector means for electrically connecting said external cable means to said conducting lines means.

5. The anti-bounce device as claimed in claim 4, wherein said external cable means is helically wound about a rigid rod means for connecting said electric connector arm means to a support assembly movable inside said elongated body, said support assembly comprising means for fastening the moving mass in a first position spaced from the target element, electromagnetic control means for selectively controlling an operation of the fastening means so s to release the moving mass means and permit an impact of the moving mass means on the target element, and electric conductor means disposed inside said rigid rod for connecting the electromagnetic control means to said conducting line means in said electric connector means.

6. The anti-bounce device as claimed in one of claims 1 or 2, wherein the magnetic means comprise at least one permanent magnet means, at least one electromagnet means, electric current supply means, and wherein said means for selectively actuating includes control means for alternately creating a magnetic force having the same direction as an attractive force of said permanent magnet means and a direction opposite said attractive force of said permanent magnet means so as to substantially cancel out a resultant attractive force.

7. The anti-bounce device as claimed in claim 2, wherein said target element and said moving mass have a substantially cylindrical shape, and wherein said magnetic means includes a plurality of magnetic assemblies disposed on said target elements symmetrically with respect to a moving direction of the moving mass.

8. The anti-bounce device according to claim 7, wherein each magnetic assembly includes a permanent magnet means and at least one electromagnet means electrically connected to said means for selectively actuating.

9. The anti-bounce device as claimed in claim 8, wherein the permanent magnet means and the electromagnet means are disposed such that a direction of magnetic field created by a flow of electric current to the electromagnet means and a magnetic field of the permanent magnet are in parallel.

10. The anti-bounce device as claimed in claim 9, wherein coil means of the respective electromagnet means are series connected such that a flow of electric current in adjacent electromagnet means creates magnetic fields opposite in direction to each other.

11. The anti-bounce device as claimed in claim 1, wherein said mass and said element have a substantially cylindrical shape, and wherein said magnetic means includes a plurality of magnetic assemblies disposed on the element symmetrically with respect to a moving direction of the moving mass.

12. The anti-bounce device as claimed in one of claim 7 or 11, wherein an even number of magnetic assemblies are provided.

* * * * *